Figure 1:
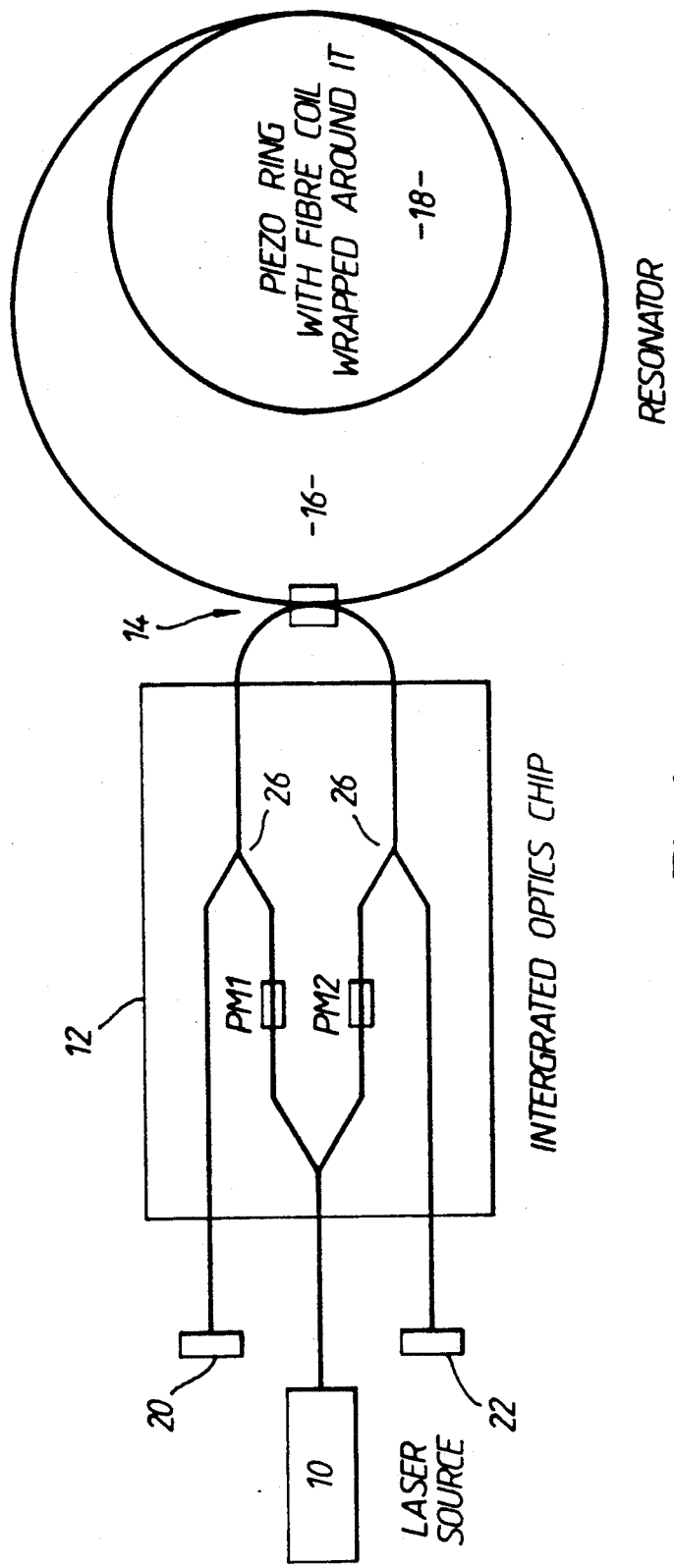

United States Patent [19]

Malvern

[11] Patent Number: 5,141,315
[45] Date of Patent: Aug. 25, 1992

[54] RING RESONATOR GYRO

[75] Inventor: Alan R. Malvern, Plymouth, United Kingdom

[73] Assignee: British Aerospace Public Limited Company, London, England

[21] Appl. No.: 541,891

[22] Filed: Jun. 21, 1990

[30] Foreign Application Priority Data

Jun. 24, 1989 [GB] United Kingdom ............... 8914561

[51] Int. Cl.⁵ .............................................. G01C 19/72
[52] U.S. Cl. .................................... 356/350; 356/345
[58] Field of Search ................................. 356/345, 350

[56] References Cited

U.S. PATENT DOCUMENTS

| | | | |
|---|---|---|---|
| 4,429,573 | 2/1984 | Walker | 73/510 |
| 4,776,700 | 10/1988 | Frigo | 356/350 |
| 4,815,851 | 3/1989 | Soohoo | 356/350 |
| 4,825,261 | 4/1989 | Schroeder | 356/350 |

FOREIGN PATENT DOCUMENTS 0141062 5/1985 European Pat. Off. .
0240949 10/1987 European Pat. Off. .
0254756 2/1988 European Pat. Off. .

OTHER PUBLICATIONS

G. A. Sanders, et al., "Evaluation of Polarization Maintaining Fiber Resonator for Rotation Sensing Applications", Optical Fiber Sensors, 1988 Technical Digest Series, vol. 2, part 2, pp. 409–412, Jan. 1988.

Mark A. Lorenz, et al., "Gas Laser Frequency Control for Passive Cavity Ring Gyros", Journal of Guidance, Control & Dynamics, vol. 11, No. 1, pp. 66–71, Jan.-/Feb. 1988.

Primary Examiner—Davis L. Willis
Assistant Examiner—LaCharles P. Keesee, II
Attorney, Agent, or Firm—Cushman, Darby & Cushman

[57] ABSTRACT

In a ring resonator gyro the CW and CCW beams are modulated to provide each with a spectrum including a carrier and an upper and a lower side band. The upper side band of one beam is kept at a resonance by a path length control loop 24 and the upper side band of the other beam is kept at a resonance by a rate control loop 40.

18 Claims, 3 Drawing Sheets

RING RESONATOR GYRO

This invention relates to a ring resonator gyroscope.

In such typical examples of gyroscopes, clockwise (CW) and counter clockwise (CCW) beams are passed in opposite directions around a resonator loop and each direction is kept at resonance by modifying the effective optical length around the loop either by directly changing the length of the resonator loop, e.g. by a piezo-electric transducer, or by modifying the frequency of the associated beam or by varying the source frequency. When both directions are at resonance, the rate of rotation applied to the gyro may be determined by detecting the frequency difference between the resonant CW and CCW beams and dividing the difference by a scale factor.

In existing proposals for ring resonator gyroscopes the frequencies of the CW and CCW beams have been shifted by acoustic optic deflectors or serrodyne phase modulation so that the CW and CCW beams are at different frequencies.

According to one aspect of this invention, there is provided a ring resonator gyro comprising a resonator loop means, means for generating a common carrier setting the frequency in the ring resonator gyro of FIG. 1.

Referring to FIG. 1, the optical components of the example of ring resonator gyro comprise a laser source 10, an integrated optics chip 12, a coupler 14, a resonator ring 16 of fibre wound on a piezo-electric ring 18 and photodetectors 20 and 22. Light from the laser source 10 is fed by a fibre to the integrated optics chip 12 where the following functions are performed: beam splitting and recombining; beam polarisation and phase modulation of the CW and CCW beams by phase modulators PM1 and PM2 respectively. Light entering the integrated optics chip 12 is polarised and then split at 24 into two equal parts. The parts then pass through the phase modulators PM1 and PM2 and are then injected into the resonator ring 16 through the coupler 14.

The filter functions of the resonator ring 16 in the CW and CCW directions, when rotation is applied, are shown in FIG. 2. It will be seen that the CW and CCW "combs" are shifted with respect to one another by an amount proportional to rotation rate. In operation, the control system shown in FIG. 3 locks both the CW and CCW directions onto resonance and reads out the difference in frequency between the two resonance combs.

On leaving the resonator ring 16, the light is split signal for CW and CCW beams, and respective frequency modulation means for applying to said CW and CCW beams respective frequency modulations to provide each with a spectrum comprising said carrier signal and two side bands.

According to another aspect of this invention there is provided a ring resonator gyro comprising resonator means of closed loop form, means for injecting into said loop respective CW and CCW beams to provide each with a spectrum comprising a carrier and two side bands, and means for controlling the gyro to cause one of said CW side bands and one of said CCW side bands to be kept at resonance.

Figure 2:
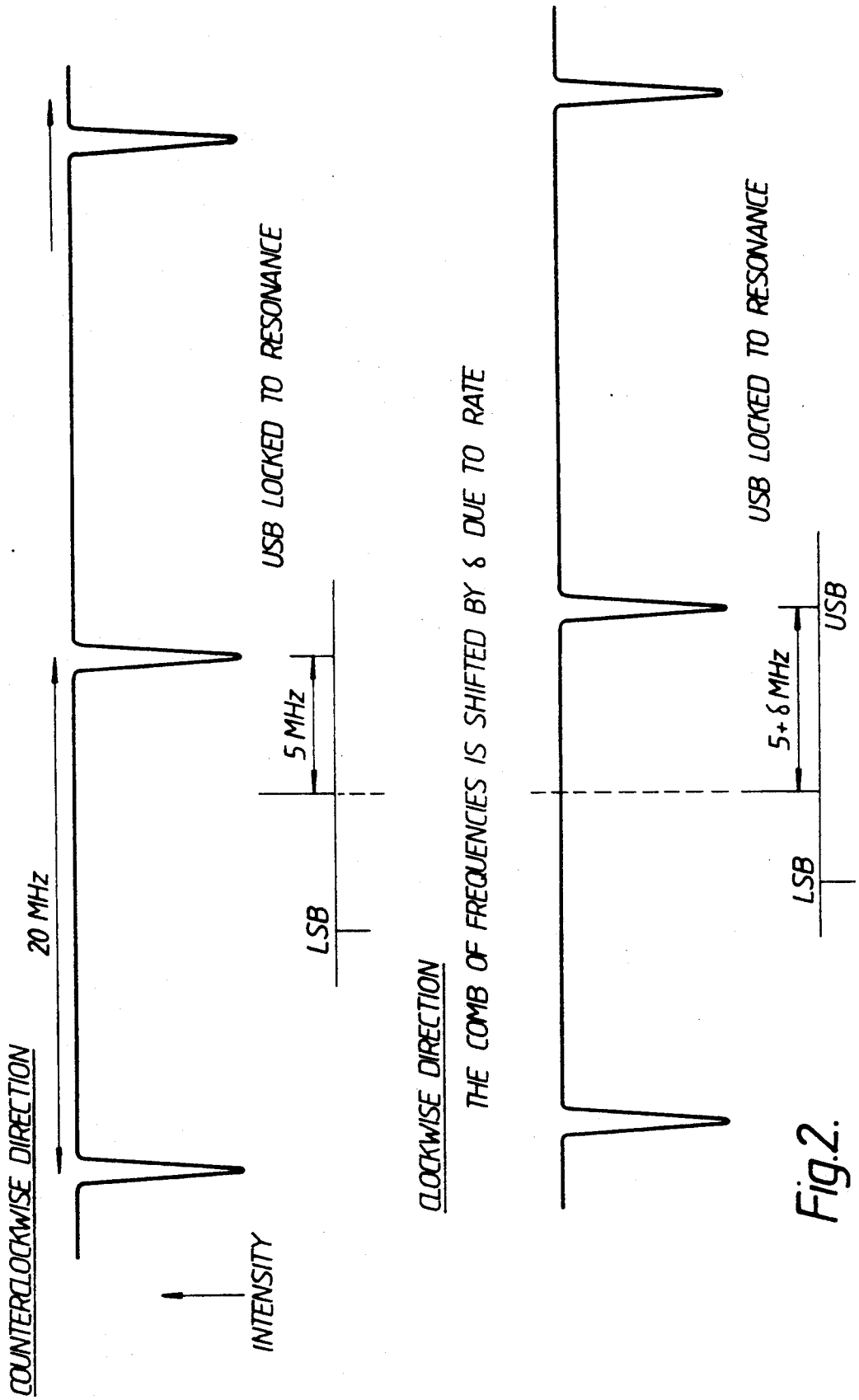
Figure 3:
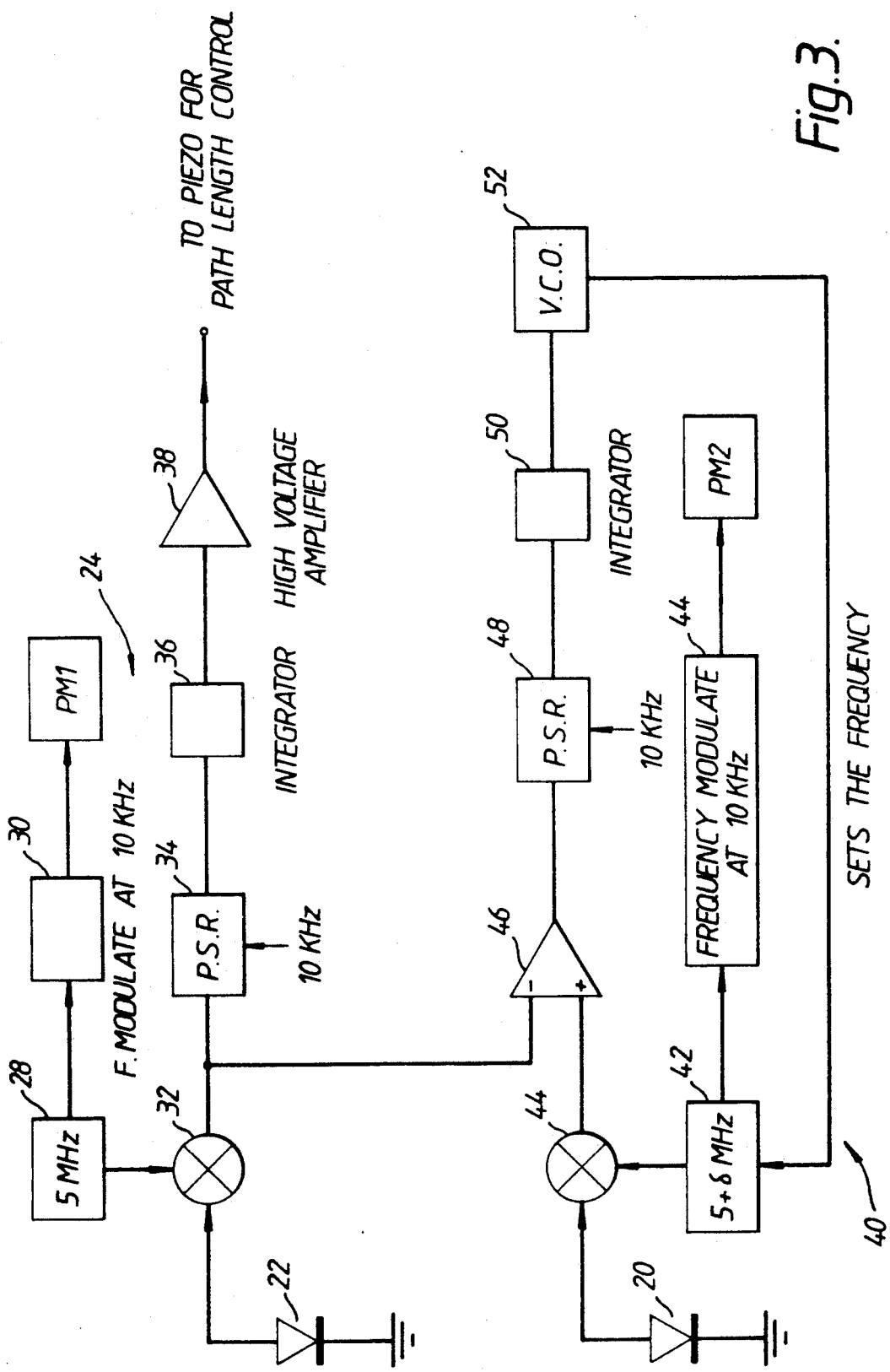

The invention may be performed in various ways and an embodiment thereof will now be described by way of example, reference being made to the accompanying drawings, in which:

FIG. 1 is a schematic diagram of the optical arrangement of a ring resonator gyro in accordance with the invention;

FIG. 2 is a graph illustrating the filter functions of the clockwise direction and the counter clockwise direction when rotation is applied to the ring resonator gyro of FIG. 1, and FIG. 3 is a schematic diagram of one of the control system for controlling the path length and at 26 on the return path through the integrated optics chip 12 and the CW and CCW portions are directed to the two photodetectors 20 and 22 respectively. The photodetectors in this example have a broad bandwidth of up to 20 MHz with a reasonably low noise figure. The light intensity on the detector may be typically between 2 and 10 uW. The resonator coil is typically 10 meters long and so the free spectral range or mode spacing is about 20 MHz.

Referring now to FIGS. 2 and 3, a frequency of 5 MHz (i.e. about one quarter of the free spectral range) is applied to the phase modulator PM1 with a low amplitude so that phase (or frequency) modulation occurs, giving rise to a spectrum of a carrier (at the operating frequency of the laser source) with two sidebands, the upper sideband (USB) and the lower sideband (LSB), which are 180° out of phase.

In this example, a path length control loop 24 is used to alter the fibre length using a voltage onto the piezo-electric ring 18 to lock the USB of the CCW beam to a resonance. In the path length control loop, a 5 MHz signal from a source 28 is frequency modulated at 30 with a deviation of $\pm 100$ KHz at a frequency 10 KHz and then applied to the phase modulator PM1 to apply a frequency modulation to the CCW beam so that it has a spectrum of a carrier with a USB and a LSB. The 10 KHz frequency modulation has the effect of scanning the laser light (i.e. the USB) across the resonance. When the CCW beam leaves the resonator ring 16 it passes to the photodetector 22 which provides a signal which is fed to a mixer 32 which is supplied with the fixed 5 MHz and which incorporates a low pass filter to obtain the information at 10 KHz. The signal is amplitude modulated at 10 KHz on the 5 MHz signal. After leaving the mixer 32 the signal is split with one part passing to a phase sensitive detector 34 which demodulates the signal. The demodulated signal is integrated at 36 and amplified at 38 and then supplied to the piezo-electric ring 18.

A rate control loop 40 operates to lock the USB of the CW beam to a resonance. In the rate control loop, a $(5+d)$ MHz signal from a source 42 is frequency modulated at 44 with a deviation of $\pm 100$ KHz at a frequency of 10 KHz and then applied to the phase modulator PM2 to apply a frequency modulation for the CW beam to provide a carrier with USB and LSB. When the CW beam leaves the resonator ring 16 it passes to the photodetector 20 which supplies a signal to a mixer 44 also supplied with the $(5+d)$ MHz signal and having a low pass filter to obtain the 10 KHz information. The signal from the mixer 44 is supplied to a differential amplifier 46 with the signal from the other mixer 32 and the difference in light intensity between the two directions is then demodulated by a phase sensitive detector 48 and the demodulated signal integrated at 50 and applied to a voltage controlled oscillator 52 to set the value of d. The output (i.e. rate) signal may be obtained by mixing the 5 MHz and $(5+d)$ MHz signals, or by using a difference counter and in this way a digital output proportional to rate is obtained, i.e. d is the output frequency proportional to rate.

For both the path length control loop 24 and the rate control loop 40, when the carrier, the USB and LSB are away from a resonance there is a large signal at 5 MHz. When the carrier is on resonance, there is no signal at 10 MHz because the carrier is notched out by the filter function of the resonator. There will also be a phase reversal around the resonance which would, if required, enable locking to be achieved on the carrier by phase-sensitive detection techniques at 5 MHz. In the described embodiment, however, locking is achieved on one side band (USB) where there is a phase reversal of the 5 MHz signal.

Referring specifically to FIG. 2, the frequency of 5 MHz is a fixed frequency and ensures that, when the USB is at a resonance, the LSB is midway between two resonances. In this way there is no signal variation from the LSB as this is on a flat part of the curve.

In order to lock onto a sideband, the 5 MHz CCW (and 5+6 MHz CW) are modulated with a deviation of 100 KHz and a frequency of 10 KH as described above. Both directions have the same frequency modulation. The USB and the LSB will sweep in opposite directions due to the 10 KHz modulations and this is used to ensure that the USB is locked, rather than the LSB, by looking at the phase of the servo.

In the system illustrated in FIGS. 1 and 3, the differencing of the outputs from the two detectors gives some common mode rejection since a path length error would otherwise appear on the rate loop as a rate error. Further improvement may be obtained using the scheme described and illustrated in our copending British Application No. 8823250.9 to which reference is directed in which, when both paths are at resonance, the relative strengths of the signals incident on the photodetectors at twice the 10 KHz modulation frequency are compared and used to adjust an automatic gain control loop to mull the gain differences between the photodetectors and associated pre-amplifiers.

Whilst in the above embodiment the USBs of the CW and CCW beams have been locked on to resonance it will of course be understood that for either or both of the CW and CCW beams the LSB may be locked on to resonance instead.

I claim:

1. A ring resonator gyro comprising:
   a resonator loop means for carrying a CW beam in a clockwise direction on a CW loop path that has a CW loop resonance frequency and carrying a CCW beam in a counterclockwise direction on a CCW loop path that has a CCW loop resonance frequency,
   means for generating a carrier signal for said CW and CCW beams,
   respective frequency modulation means for applying to said CW and CCW beams respective frequency modulations to provide each with a spectrum comprising said carrier signal and two side bands; and
   control means for controlling said frequency modulation means to adjust the frequency of a selected CW sideband and a selected CCW sideband relative to the CW loop resonance frequency and the CCW loop resonance frequency respectively, thereby to maintain a sideband of said CW beam and said CCW beam at resonance.

2. A ring resonator gyro according to claim 1, wherein a further frequency modulation, at a fixed frequency is applied to each of said CW and CCW beams for enabling respective servo loops to maintain at least a component of each of said CW and CW beams at resonance.

3. A ring resonator gyro according to claim 1, wherein one of said frequency modulation means applies a fixed frequency modulating signal and the other of said frequency modulation means applies a variable frequency modulating signal.

4. A ring resonator gyro according to claim 3, including control means to control said other frequency modulation means to adjust the frequency of the modulating signal to maintain a side band of the frequency modulated signal at the resonance condition in the resonator loop.

5. A ring resonator according to claim 4, wherein said side band is the upper side band.

6. A ring resonator gyro according to claim 1, which includes path length control means operable to adjust the effective path length of the resonator loop to maintain a sideband of the signal produced by said one frequency modulation means at the resonance condition.

7. A ring resonator gyro according to claim 1, wherein the frequency of the frequency modulating signal is approximately one quarter the free spectral range of the resonator loop means.

8. A ring resonator gyro according to claim 1, including a first channel having first detector means and first amplifier means for receiving a portion of the CW beam and providing a CW signal, a second channel having second detector means and second amplifier means for receiving a portion of the CCW beam and providing a CCW signal, and gain control means for mulling the gain differences between the first and second channels.

9. A ring resonator gyro comprising resonator means of closed loop form, means for injecting into said loop respective CW and CCW beams, means for modulating said CW and CCW beams to provide each with a spectrum comprising a carrier and two side bands, and means for controlling the gyro to cause one of said CW side bands and one of said CCW side bands to be kept at resonance.

10. A ring resonator gyro according to claim 9, wherein said control means includes a first control loop responsive to changes in optical path length of the resonator and a second control loop responsive to changes in applied rate, each control loop maintaining a respective one of the CW and CCW side bands at resonance.

11. A ring resonator gyro according to claim 9, including means for modulating a common carrier beam with a fixed frequency to provide one of said CW and CCW beams and means for modulating said carrier beam with an adjustable frequency to provide the other of said CW and CCW beams.

12. A ring resonator gyro comprising:
   a resonator loop means;
   means for injecting into said loop means respective clockwise (CW) and counterclockwise (CCW) beams;
   means for modulating said CW and CCW beams to provide each with a frequency spectrum comprising a carrier and two side bands, and
   control means for controlling said modulating means to adjust frequency spectra of said CW and CCW beams, to cause one of said CW side bands and one of said CCW side bands to be kept at a resonance of said resonator loop means.

13. A ring resonator gyro according to claim 12, wherein said means for modulating comprises two frequency modulators, one associated with each beam respectively.

14. A ring resonator gyro according to claim 13, wherein one of said frequency modulators is controlled to provide a modulation comprising a modulated set frequency component and the other of said frequency modulators is controlled to provide a modulation comprising a modulated variable frequency component.

15. A ring resonator gyro according to claim 14, wherein said one frequency modulator is included in a optical path control loop together with means for adjusting the optical path length and said other frequency modulator is included in a frequency control loop together with means for detecting an intensity of at least one of said CW and CCW beams.

16. A resonator as in claim 9 wherein said carrier of said CW beam and of said CCW beam is a common carrier.

17. A resonator as in claim 12 wherein said carrier of said CW beam and of said CCW beam is a common carrier.

18. A resonator as in claim 1, wherein said carrier of said CW beam and of said CCW beam is a common carrier.

* * * * *